United States Patent [19]

Cleary et al.

[11] 4,299,001

[45] Nov. 10, 1981

[54] NUT TAPPING MACHINE

[75] Inventors: Sean J. Cleary, Loughrea; Noel L. Furlong, Galway, both of Ireland

[73] Assignee: The Institute for Industrial Research and Standards, Dublin, Ireland

[21] Appl. No.: 74,576

[22] Filed: Sep. 11, 1979

[51] Int. Cl.³ .............................................. B23G 1/44
[52] U.S. Cl. .................................... 10/133; 10/139 R
[58] Field of Search ............... 10/129 R, 133, 139 R, 10/139 WH, DIG. 5, DIG. 6

[56] References Cited

U.S. PATENT DOCUMENTS 3,056,983  10/1962  Devereux et al. ............ 10/139 R X

FOREIGN PATENT DOCUMENTS 2253124  5/1974  Fed. Rep. of Germany .
877156   9/1961  United Kingdom .

*Primary Examiner*—Mark Rosenbaum
*Attorney, Agent, or Firm*—Sughrue, Mion, Zinn, Macpeak & Seas

[57] ABSTRACT

The invention provides a nut tapping machine of the type driven by a drive chuck assembly comprising two sets of shank-embracing driving chucks one of which is always in engagement with the tap shank to drive it and each set is releasable sequentially from engagement with the tap shank to allow the passage of a blank along the shank. The invention solves the problems of incorrect thread form associated with other known tapping machines by providing a blank chuck assembly including a set of inwardly movable jaws each having a first flat face for engagement with the exit surface of a blank to true the blank relative to the tap.

21 Claims, 20 Drawing Figures

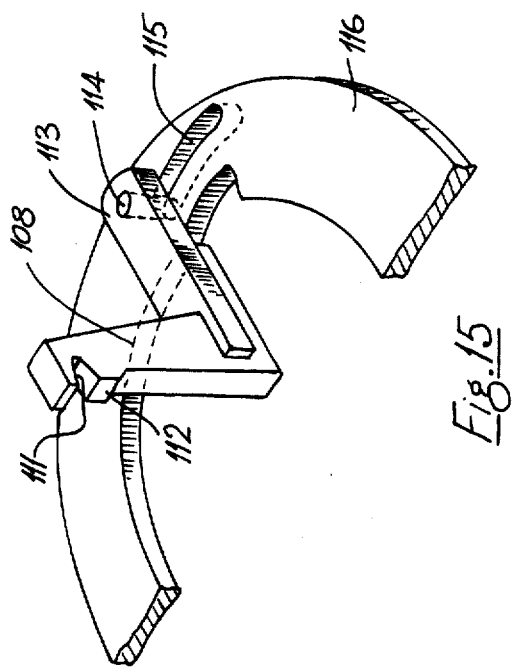
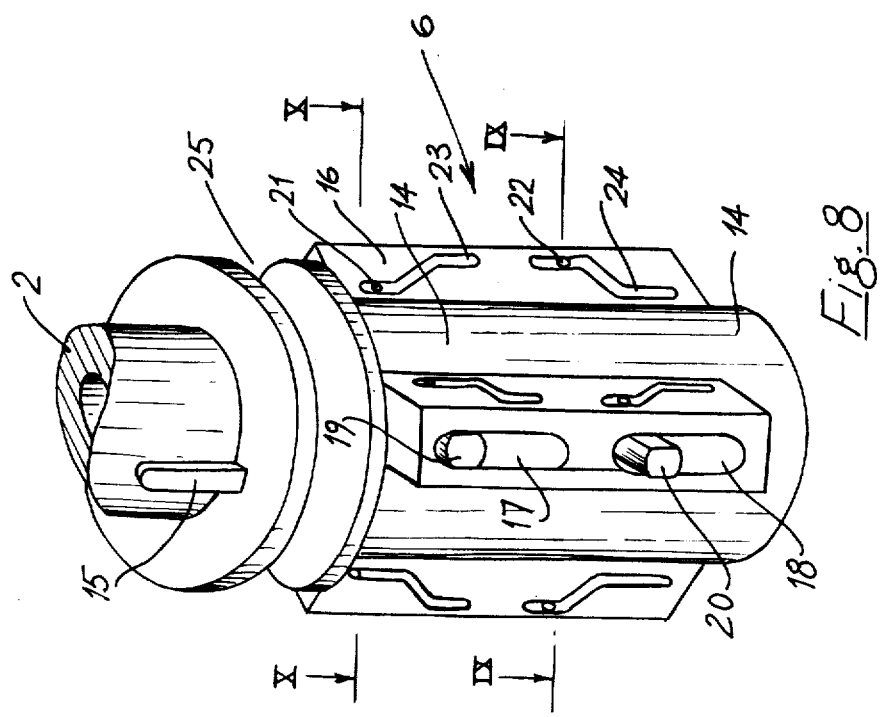

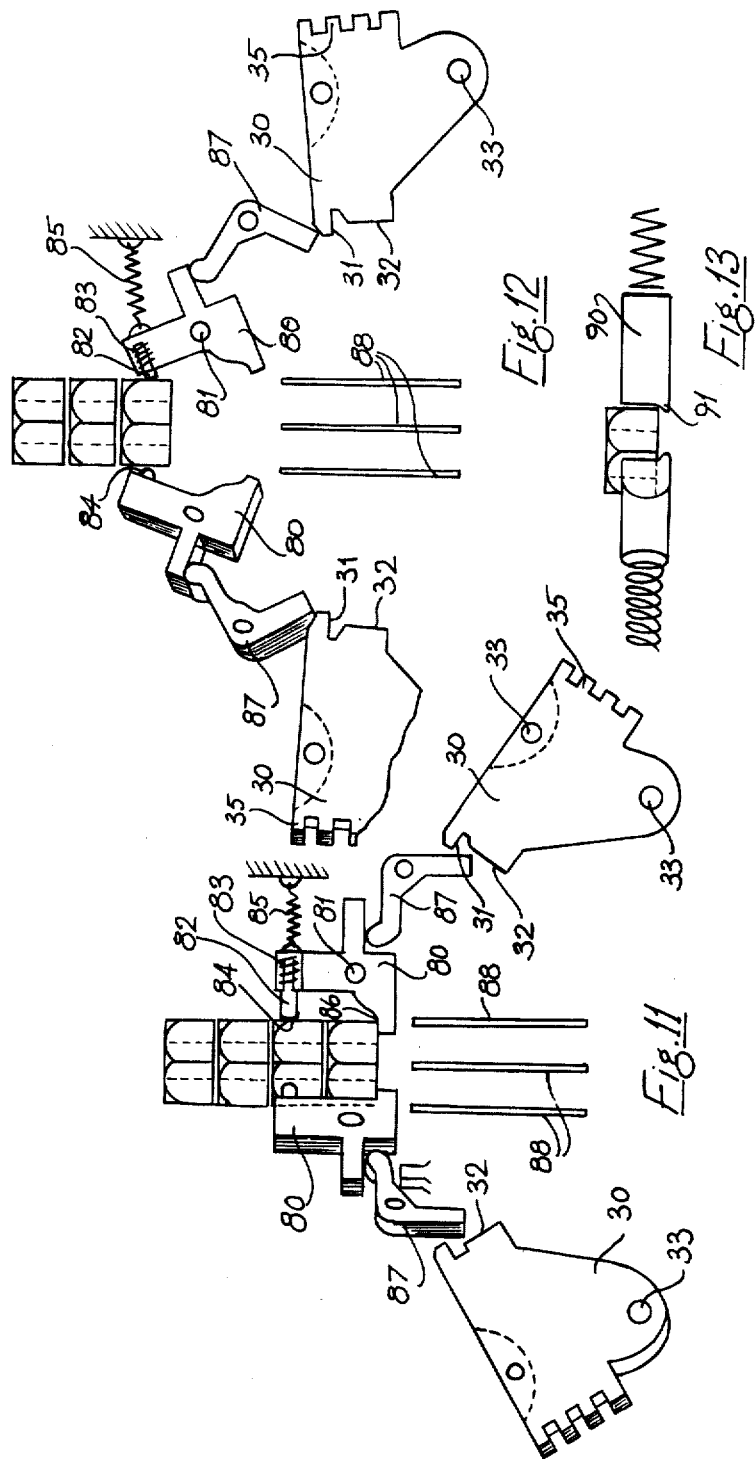

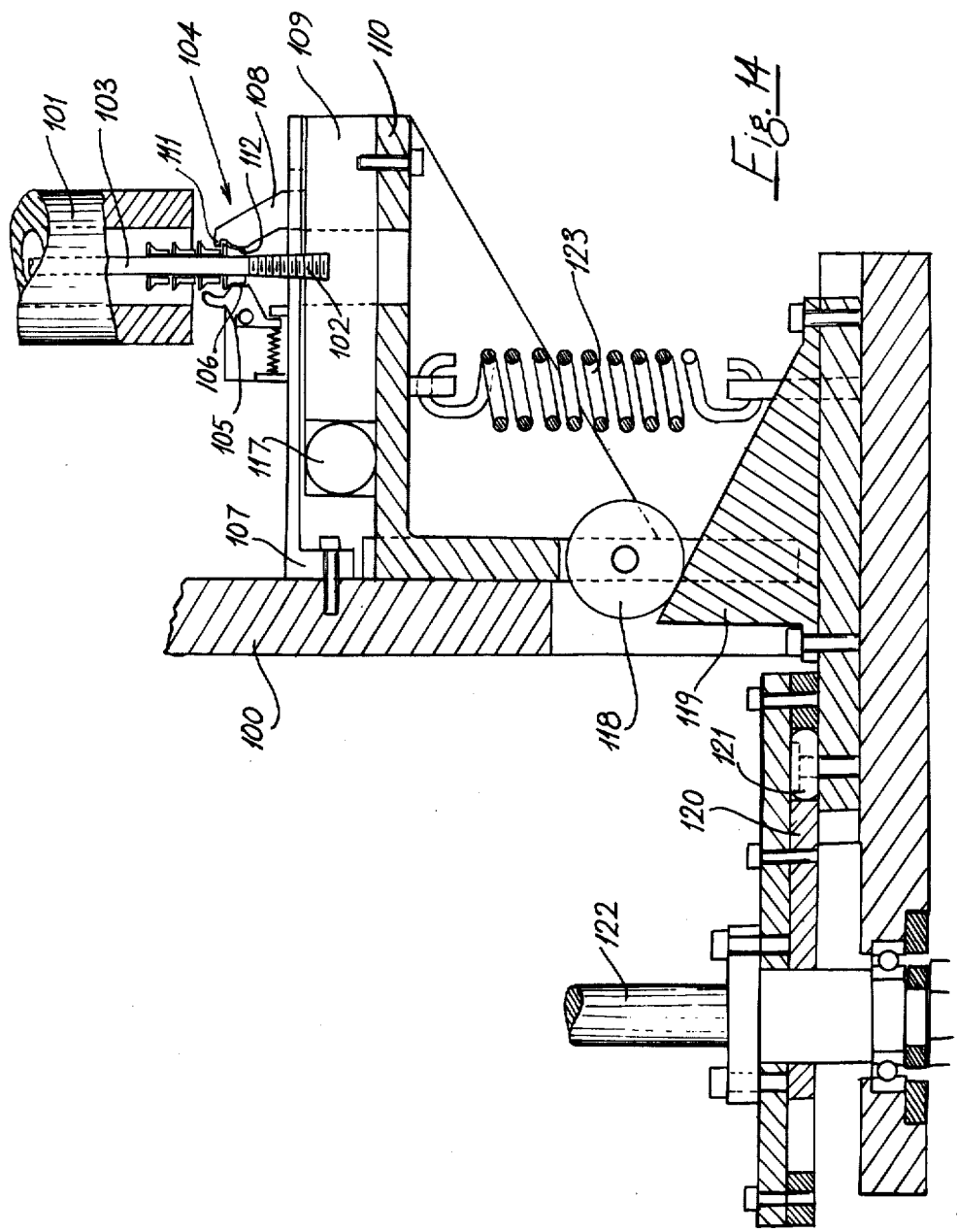

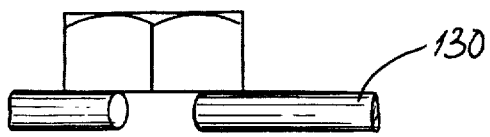
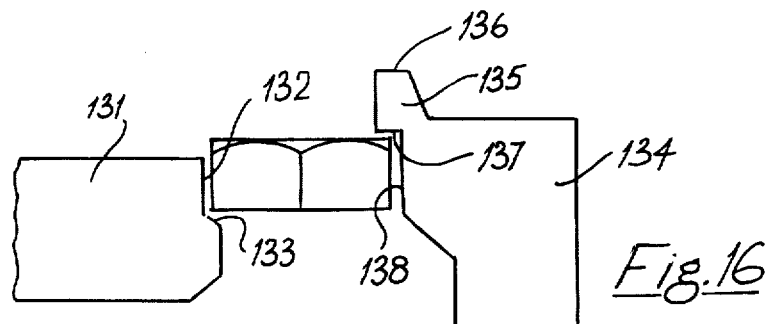
Fig. 16
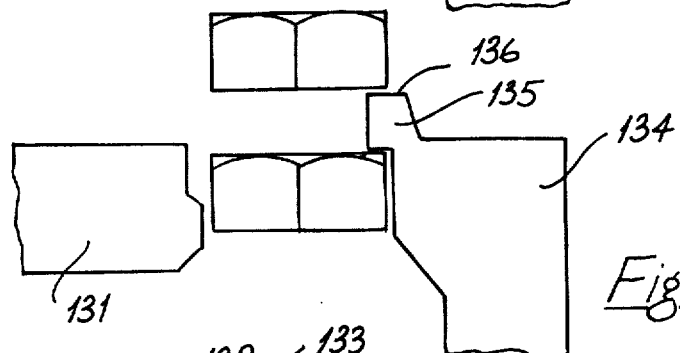
Fig. 17
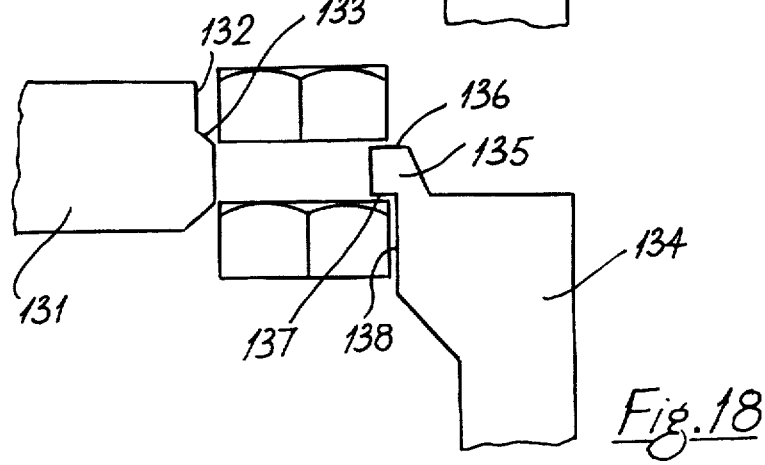
Fig. 18

NUT TAPPING MACHINE

BACKGROUND OF THE INVENTION

Introduction

This invention relates to a tapping machine for internally threaded components such as nuts, threaded fasteners, sockets and collars.

Field of the Invention

Nuts and other internally threaded components are manufactured from blanks formed with a central hole or opening and the desired thread is formed internally therein, using a suitably hardened steel tap. Generally, such a blank has a straight through hole and, effectively, this hole projects through two surfaces which form an entrance surface and an exit surface for the threaded screw cutting portion of the tap. These surfaces are usually parallel and as long as one of the surfaces is in a plane perpendicular to the hole axis an accurate thread profile can usually be formed. This, needless to say, presumes that the tap is driven at the correct speed and that accurate pitch control is achieved. It will be appreciated that if the nut is presented square to the tap's axis and if so held during the thread cutting operation the thread axis must be correctly aligned.

There are many types of tapping machines for tapping blanks in a continuous operation. However, the machines heretofore known have various drawbacks and in particular it has been found difficult with existing machines to produce in a reliable manner, components having a sufficiently high degree of accuracy in the finished thread.

Generally, it is relatively easy to get accuracy in the tapping of nuts by using some form of "in-out" machine. Unfortunately, this "in-out" machine has a low throughput and the wear on the tap is considerable. This "in-out" machine is suitable for flanged nuts and such flanged nuts are being used more and more extensively particularly in the aeronautical and automotive industries.

Bent shank run-over machines are ideal from a production point of view in that they have a relatively high output. Unfortunately, the present constructions of bent shank run-over machines have relatively low accuracy and are generally unsuitable for flanged nuts. This inaccuracy is caused because inter-alia the tap is not axially located and therefore, the point of the tap tends to ream the bore thus reducing thread depth. Incorrect thread form is also caused by a lack of axial control when the tap starts to cut as it has relatively little self guidance particularly at the initial stages. The method of holding and driving the tap makes it difficult to avoid "radial run-out" which may be aggravated by distortion of the tap shank itself.

It is known to provide a machine for the screw threading of blanks in which the tapping machine has a tap forming a threaded screw cutting portion and a tap shank in which a pair of shank-embracing driving chucks, longitudinally spaced apart relative to the tap shank, are so arranged that at least one of the chucks is always in engagement with the tap shank to rotate it. The chucks are releasable sequentially from engagement with the tap shank to allow the passage of a blank along the shank. Such a vertical tapping machine is described in British Pat. No. 877,156. However, while this machine overcomes part of the problem, unfortunately, in operation it would still not lead to sufficiently accurate tapping due to the fact that the actual location of the blanks being tapped is not accurately arranged relative to the tap itself. Again this method of using two sets of opening jaws or chucks is described in U.S. Pat. No. 3,056,983.

It will be appreciated that if a sufficiently accurately thread form is to be cut it is essential that the hole axis and the tap axis be accurately aligned and that the blank is moved relative to the screw cutting portion of the tap at the correct rate to ensure accurate pitch control.

In this specification the invention has been described with reference to flanged and plain hexagonal nuts as these are the type of fasteners most commonly used. It will, however, be apparent that where the term "hexagonal nut blank" is used that it generally covers all such blanks whether six sided or not.

SUMMARY OF THE INVENTION

The present invention is directed towards providing an improved construction of nut tapping machine.

Another object of the invention is to provide a nut tapping machine in which the hole axis and the tap axis can be accurately aligned and the blank can be moved relative to the screw cutting portion of the tap at the correct rate to ensure accurate pitch control.

A further object of the invention is to provide a nut tapping machine which will have a relatively high throughput.

A still further object of the present invention is to provide a nut tapping machine in which "radial run-out" will be avoided.

BRIEF DESCRIPTION OF THE DRAWINGS

The above and other objects and advantages of this invention will become apparent from the following detailed description of some embodiments of the invention in connection with the accompanying drawings.

FIG. 8 is a perspective view of a tap drive chuck assembly forming part of the nut tapping machine, FIG. 11 is a side diagrammatic view of an alternative construction of blank chuck feed mechanism for plain nuts, FIG. 12 is a view showing operation of the mechanism of FIG. 11, FIG. 13 is a view of an arrester device for use with plain nuts, FIG. 14 is a sectitonal view similar to FIG. 1 of portion of an alternative construction of vertical nut tapping machine according to the invention showing portion of the blank chuck assembly, FIG. 15 is a perspective view of portion of the blank chuck assembly illustrated in FIG. 14, FIGS. 16 to 18 are diagrammatic views showing the operation of a blank chuck assembly for use with the embodiment of FIGS. 14 and 15.

Figure 1:
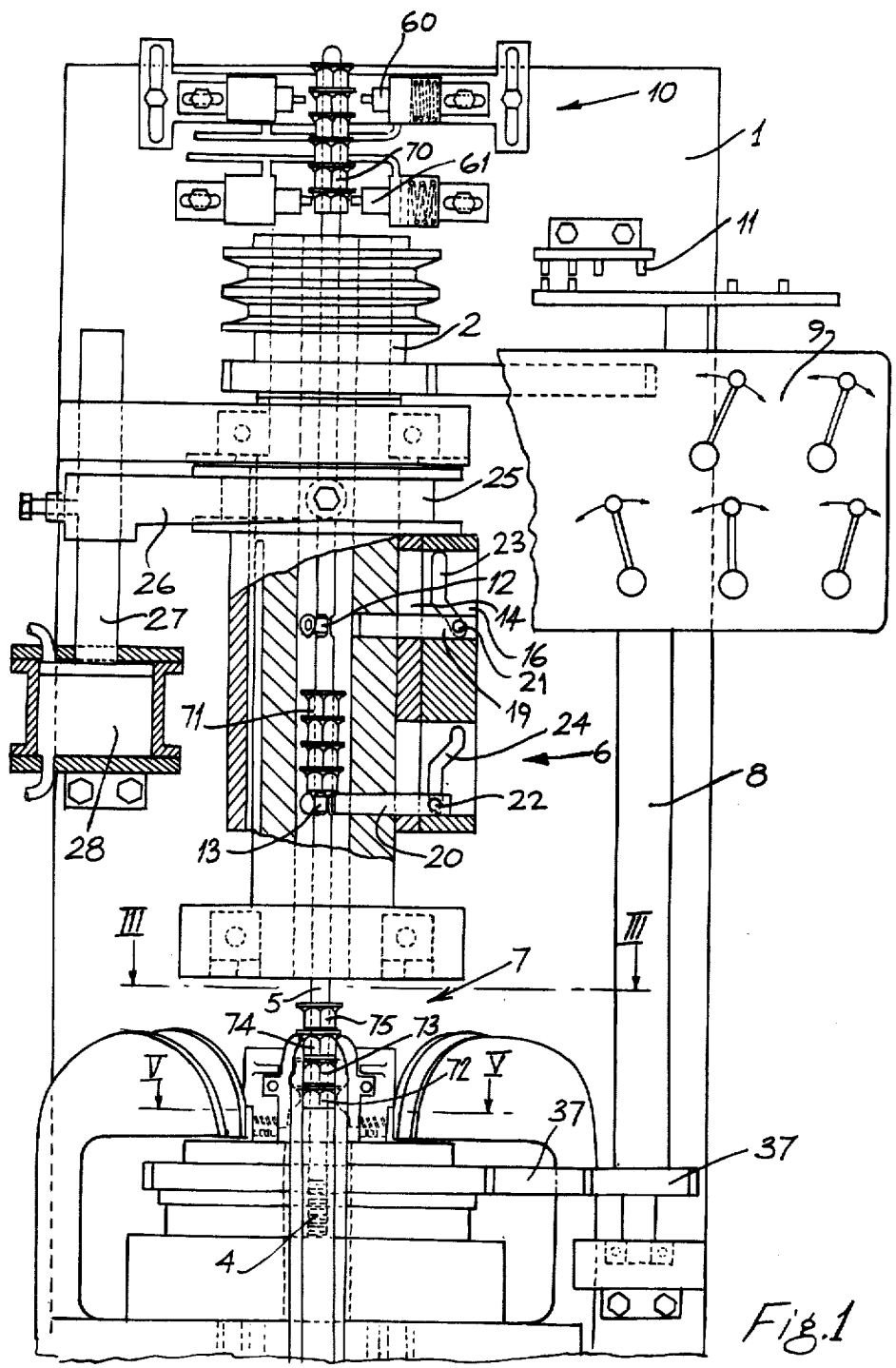
FIG. 1 is a cross-sectional part diagrammatic view of a vertical nut-tapping machine according to the invention.
Figure 2:
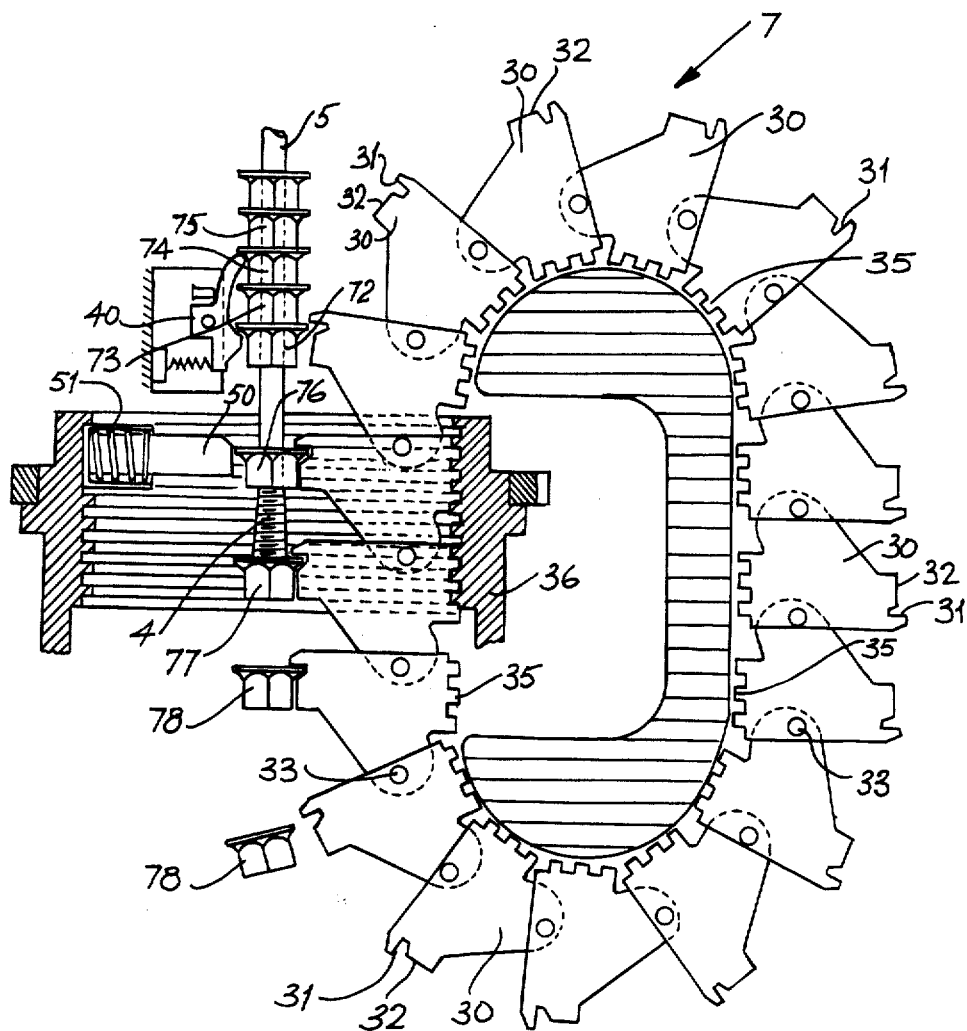
FIG. 2 is a detailed part diagrammatic view of a blank chuck assembly according to the invention, illustrating the operation of the chuck.

Referring to the drawings, and initially to FIGS. 1 to 10 thereof there is illustrated a vertical nut-tapping machine for flanged hexagonal nuts. In the drawings the general machine support housing and the like standard equipment and controls are not illustrated in any detail. The tapping machine includes a machine support 1 on which is mounted a hollow drive sleeve 2 driven through a pulley drive 3 by a motor (not shown). The hollow drive sleeve 2 houses a straight tap having a threaded screw cutting portion 4 and a tap shank 5 which is driven through a tap drive chuck assembly indicated generally by the reference numeral 6. A blank chuck assembly, indicated generally by the reference numeral 7 which is driven by a shaft 8 through a gear box 9 from the drive sleeve 2 is mounted below the tap drive chuck assembly 6. A blank feed mechanism 10 is mounted above the machine and together with the drive chuck assembly 6 is operated by pneumatic power and the sequence of operation is controlled conventionally by limit switches 11 mounted on the drive shaft 8, again these limit switches 11 are only illustrated in outline.

Dealing firstly with the tap it can be seen that the threaded screw cutting portion 4 is generally of conventional construction and the tap shank 5 is of circular cross-section, being reduced to the form of an equilateral triangle at 12 and 13.

Figure 9:
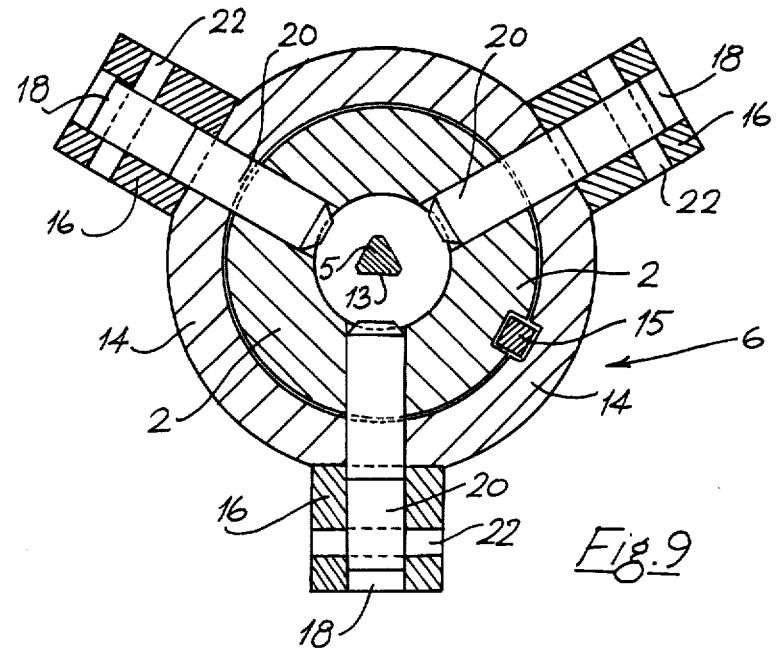
FIG. 9 is a cross-sectional view in the direction of the arrows IX—IX of FIG. 8.
Figure 10:
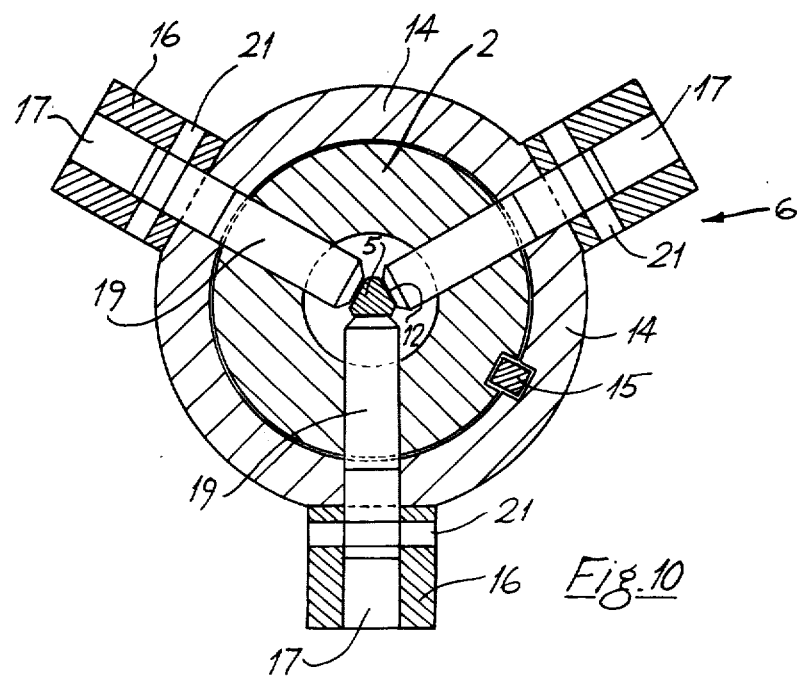
FIG. 10 is a cross-sectional view in the direction of the arrows X—X of FIG. 8.

Referring to FIGS. 8, 9 and 10 there is illustrated the drive chuck assembly 6 which includes a sleeve 14 secured to the drive sleeve 2 by an axially arranged key 15. Mounted on the sleeve 14 are three longitudinally arranged profile blocks 16. Each profile block 16 is provided with an upper slot 17 and a lower slot 18 which house upper driving plungers 19 and lower driving plungers 20, thus forming two sets of shank-embracing driving chucks. Each plunger 19 and 20 projects through a hole in the drive sleeve 2 adjacent the reduced section of the tap shank 4 at 12 and 13 respectively. A transverse pin 21 and 22 is mounted on each upper driving plunger 19 and lower driving plunger 20 respectively and each pin 21 and 22 projects through camming slots 23 and 24 in each profile block 16. The sleeve 14 has a groove 25 which engages a Y-shaped yoke 26 (see FIG. 1) connected to a piston 27 of a hydraulic ram 28. The hydraulic ram 28 allows the sleeve 14 to be reciprocated the movement being controlled by the limit switches 11. Movement of the sleeve 14 causes the plungers 19 and 20 to be moved radially inwards and outwards in the driving sleeve 2 thus engaging with and disengaging from the tap shank 4. FIG. 9 shows the lower driving plungers 20 disengaged from the tap shank 5 while FIG. 10 shows the upper driving plungers 19 engaged with the tap shank 5 at 12 as does FIG. 8 while FIG. 1 shows the reverse. It will be readily apparent from FIG. 8 that this position will be assumed because of the arrangement of the profile block 16. Thus it will be noted that on reciprocation of the hydraulic ram 28 at least one of the sets of driving plungers forming the necessary driving chuck will always be in engagement with the tap shank 5.

The blank chuck assembly 7 basically has three components namely pulling jaws forming the actual blank chuck, a combined blank feed mechanism which incorporates the additional functions of spin killing and orientation and an arrester guide mechanism.

The blank chuck assembly includes a blank chuck having a plurality of sets of pulling jaws 30. Each pulling jaw 30 has an underneath first flat face 31 for engaging a nut blank and a second flat face 32 extending at right angles to the first flat face 31. The first flat face 31 is for engaging the exit face of the blank while the second flat face 32 is adapted to engage the sides of the hexagonal nut. The second flat faces are so arranged as to accommodate normal manufacturing tolerances in the blank. Three pulling jaws 30 co-operate together to form a set of pulling jaws for the one blank. The pulling jaws 30 are interconnected by pins 33 and effectively form an endless chain or belt mounted within a support 34. The rear of each pulling jaw 30 is provided with teeth 35 adapted to engage a drive wheel 36 which in turn is driven through a gear train 37 by the drive shaft 8.

Mounted at the entry to the blank chuck assembly 7 is a blank chuck feed mechanism which performs the functions of storage, spin killing and orientation. That it is necessary to stack the blanks above the screw cutting portion 4 of the tap is self evident. It will also be appreciated that as a blank passes down the tap shank 5 it will of necessity, have rotation imparted to it and it is necessary for this kinetic energy to be dissipated if it is to be correctly located in the blank chuck. Further, if the pulling jaws are to correctly engage the blank it is essential that the second flat faces 32 of the pulling jaw 30 engage the flat sides of the blank.

This blank chuck feed mechanism comprises three orientation plates 40 circumferentially arranged around the tap shank 5 each plate 40 is spring biased by a spring 41. The plates are arranged at spacings of 120°, 125° and 115° relative to each other to assist in the location of hexagonal nuts as will be explained below. Each orientation plate 40 is provided with an upwardly projecting lug 42 and an inwardly projecting support 43 which are spaced apart and arranged so that one or other is always in contact with a nut blank. The inwardly projecting support 43 has an orientation face 44 for engagement with the vertical side of the hexagonal nut blank and a support face 45 for engagement with an underneath face of a hexagonal nut blank, in this embodiment, for engagement with the underneath face of the flange of the nut blank. It will be noted that each plate 40 is pivotally mounted on a pin 46. It will be noted from FIG. 5 that the orientation face 44 of the support 43 is preferably of arcuate shape in plan. The upwardly projecting lug 42 has an upper blank engaging surface which forms a spin killing surface 46a, which, in use, lies above the uppermost position of travel of the pulling jaws 30 when they are in engagement with a blank.

Three arrester guides 50 (see FIG. 4) are arranged adjacent to the entry to the thread cutting portion 4 of the tap. The arrester guides 50 are formed from bars which are inwardly biased by springs 51.

The blank feed mechanism 10 above which is mounted a conventional feed hopper or the like (not shown) comprises a set of upper jaws 60 and lower jaws 61. The jaws 60 and 61 are pneumatically sequentially operated and are substantially equi-spaced around the tap shank 5.

In operation, a number of flanged hexagonal blanks 70 are fed onto the lower jaws 61 of the blank feed mechanism 10 by opening the upper jaws 60, for clarity the blanks are identified by the reference numerals 70 to 78 depending on their position within the nut-tappping machine. With the upper jaws 60 closed, the lower jaws 61 are opened, blanks 70 in this case four blanks are allowed to fall on the upper driving plungers 19 which are in engagement with the tap shank 5 at 12. At this stage the lower driving plungers 20 are open. The lower driving plungers 20 then close and the upper driving plungers 19 open allowing the four blanks 71 to drop onto the lower driving plungers 20.

The lower driving plungers 20 are then opened and the upper driving plungers 19 closed allowing four blanks namely a lowermost blank 72 and three uppermost blanks 73 to enter the blank chuck feed mechanism 7. Generally, except during startup when the first blank is falling through the machine a blank will fall on another blank already in position. Strictly speaking the position of the blanks illustrated in the drawings and specifically FIGS. 6 and 7 would not be attained until the machine had been running and the orientation plates 40 had been pivoted to allow the blanks to fall between them. Assuming that this has happened the lowermost blank 72 now rests on the support faces 45 and engages the three orientation faces 44 and is then engaged by the pulling jaws 30 and pulled downwards as will be described below. As the lowermost blank 72 is pulled downwards it causes the orientation plates 40 to pivot against the springs 41. As the orientation plates 40 (see FIG. 7) pivot the orientation faces 44 are pushed outwards allowing the next uppermost blank 73 which is resting on the blank 72 to fall between them until it comes to rest with its flange on the support surface 45. In this first position the blank 73 rests between but spaced apart from the orientation faces 44. When the lowermost blank 72 is moved out of engagement with the orientation surface 44 the orientation plates 40 can now pivot into a second position where the orientation faces 44 engage the vertical sides of the hexagonal nut blank 73.

If necessary the orientation plates 40 will rotate a blank until the three orientation faces 44 engage a vertical side and the blank is now correctly orientated. As the orientation plates 40 are not equispaced circumferentially it means that even if two corners of a nut blank engage the orientation faces 44 the orientation face 44 of the third orientation plate 40 is of necessity offset from a corner of the blank 72 and in closing in on the blank under the action of the spring 41 it must engage a vertical side of the blank. It will not act through the axis of the blank so that under the action of its spring 41 it will rotate the blank 72 slightly so that the three orientation faces 44 come in contact with the flat faces of the blank and thus correctly orientate it to receive the pulling jaws 30.

The flat face 31 of each of the three pulling jaws 30 forming a set engage over the top of the blank 72 and as explained already pull it through the supports 43 thus pushing the orientation faces 44 outwards against the spring 41 and simultaneously pivoting the lug 42 inwards to engage beneath the flange of the second next uppermost blank 74.

When the blank 72 has passed fully through the orientation faces 44 the orientation plates 40 can pivot out to their second position to engage the blank 73 to orientate it. Simultaneously, the lug 42 pivots outwards and allows the next uppermost blank 74 which has been resting on it to fall down onto the other blank 73 still retained between the orientation plates 40. It will be appreciated that when the blank 74 was being supported by the lugs 42 it of necessity engaged the spin killing surface 46a. Generally, the blank 74 that has been engaged by the lug 42 will have already been resting on another blank as the blank 75 is illustrated resting on it and therefore, any kinetic energy imparted to it will have generally been dissipated by this contact with another blank. If, however, there is any rotation still imparted to the blank 74 when it rests on the spin killing sufaces 46a this rotation and kinetic energy will of necessity be dissipated.

Figure 4:
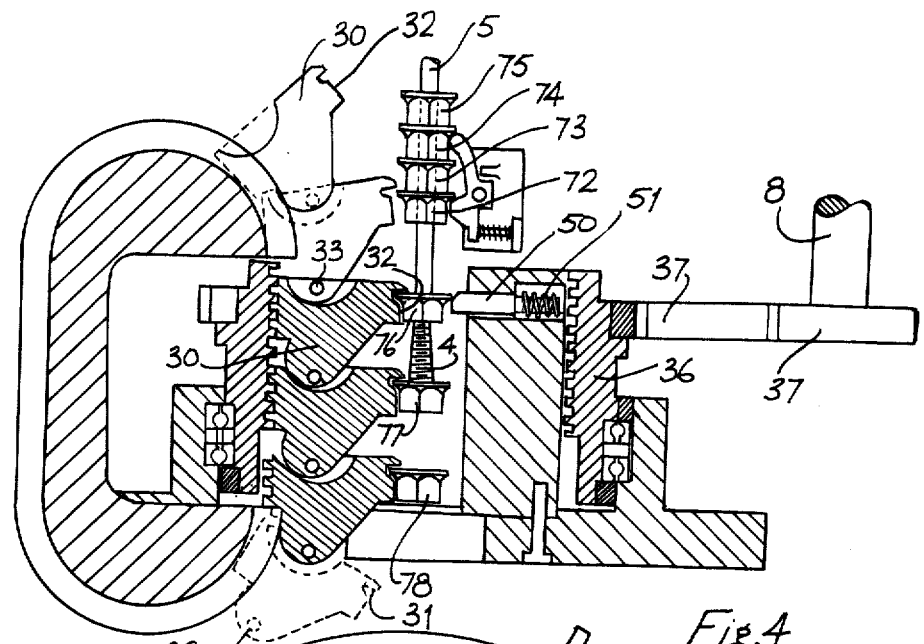
FIG. 4 is a cross-sectional view in the direction of the arrows IV—IV of FIG. 3.
Figure 3:
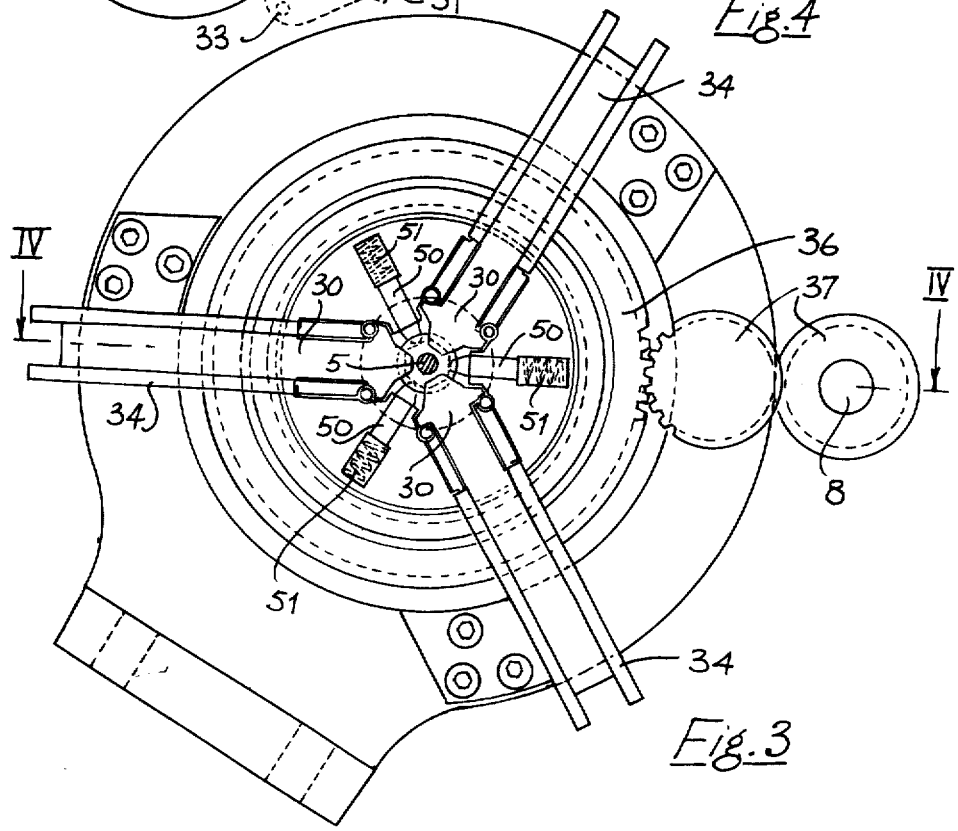
FIG. 3 is a plan cross-sectional view of the blank chuck assembly in the direction of the arrows III—III of FIG. 1.
Figure 6:
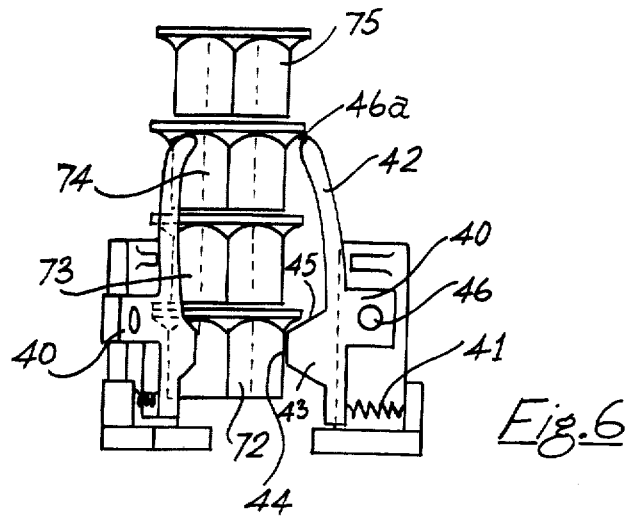
FIG. 6 is a side, diagrammatic view of the arrester mechanism.
Figure 7:
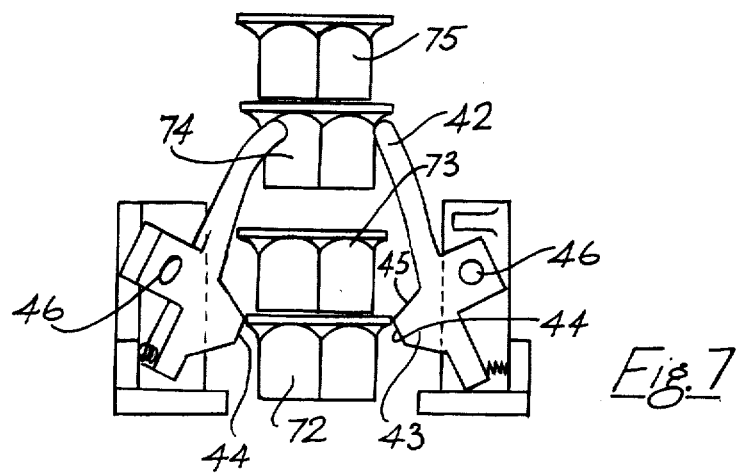
FIG. 7 is a diagrammatic view showing the operation of the arrester mechanism.
Figure 5:
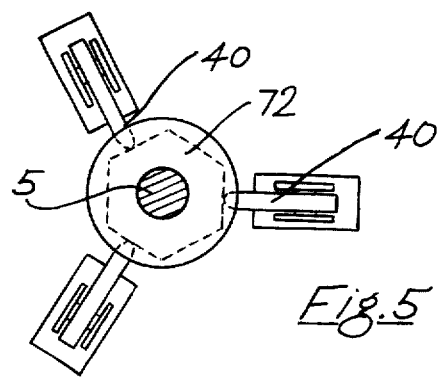
FIG. 5 is a plan cross-sectional view in the direction of the arrows V—V of FIG. 1 of an arrester mechanism forming part of the blank chuck assembly.

The blank 76 is then pulled down into engagement with the arrester guides 50 (see FIG. 4). As the blank 76 is pulled through the arrester guides 50 they will provide a resistance to the passage of the blank 76. This of necessity forces the exit face of the blank 76 into close contact with the first faces 31 of the pulling jaws 30 thus squaring up the exit face to the hole axis and ensuring that the thread axis is square to the exit face at the beginning of the thread cutting operation. Once this initial squareness has been imparted it will of necessity be preserved during the cutting operation.

The blank 77 (see FIGS. 2 and 4) is then drawn through the screw cutting portion 4. The threaded nuts 78 are then removed.

In the embodiment described above the blank chuck feed mechanism is suitable for use with flanged nuts. It will be appreciated, however, that it would not be suitable for plain hexagonal nuts. Referring to FIGS. 11 and 12 there is illustrated a blank feed mechanism to be used in conjunction with the blank chuck assembly 7. The blank chuck feed mechanism comprises three orientation plates 80 each pivotally mounted by a pin 81. An inwardly directed bar 82 spring loaded by a spring 83 forms part of the plate 80 and defines an orientation face 84. The plate 80 is biased into the upright position by an anchor spring 85.

The orientation plate which includes a support face 86 engages a pivotally mounted lever 87 which, in use, is operated by the pulling jaws 30 as can be readily seen from the drawings. Three bars 88 are mounted below the orientation plates 80.

In operation, with the blank chuck feed mechanism in the position illustrated in FIG. 11 the lowermost blank rests on the support face 86 having already been orientated by the bars 82. Another blank is resting on it between the orientation faces 83. When the pulling jaw 30 moves downwards it causes the orientation plates 80 to pivot as illustrated in FIG. 12 so that the orientation faces 84 engage then nut blank and the nut blank resting on the support faces 86 is delivered between the bars 88.

Referring to FIG. 13 there is illustrated a construction of arrester guide 90 which is of substantially similar construction to the previously described arrester guide except that it is provided with a bottom lip 91 for support to the nut blank.

It will be appreciated that the arrangement of blank chuck feed mechanism and arrester guide as described with reference to FIGS. 11 to 13 is merely shown to illustrate how other types of blanks can be accommodated.

Referring to FIGS. 14 and 15 there is illustrated portion of an alternative construction of vertical nut tapping machine. The tapping machine includes a machine support 100, a hollow drive sleeve 101, a tap having a threaded screw cutting portion 102, and a tap shank 103; the tap is driven by a tap drive chuck assembly similar to that described already, with reference to FIGS. 1 to 10. A blank chuck assembly is illustrated and is indicated generally by the reference numeral 104. In this embodiment of the invention the blank chuck assembly 104 has basically two components namely pulling jaws forming the actual blank chuck and a combined blank feed mechanism which incorporates the additional functions of spin killing, blank orientation and arresting. The blank chuck assembly 104 includes three orientation and arrester plates 105 arranged at spacings of 120°, 125° and 115° relative to each other. These orientation and arrester plates 105 have the same construction as those described already except that their orientation faces 106 perform the same function as the previously described arrester guides in addition to their orientation function. These orientation and arrester plates 105 are mounted by means of a support plate 107 on the machine support 100.

A set of pulling jaws formed from three pulling jaws 108 are housed within a support 109 which is in turn mounted on a base 110 which slidably engages the machine support 100.

Each pulling jaw 108 has an underneath first flat face 111 and a second flat face 112. The pulling jaw 108 has a shank 113 which engages by means of a pin 114, a camming slot 115 in a cam ring 116 housed in the support 109. The cam ring 116 is pivoted by means of a pneumatic ram 117. It will be readily apparent that operation of the pneumatic ram 117 will cause the pulling jaws 108 to move radially inwards and outwards.

The base 110 has a roller 118 forming a cam follower which engages a wedge-shaped pitch cam 119 the movement of which is in turn, controlled by an edge cam 120 through a cam follower 121. The edge cam 120 is driven by a shaft 122 from the tap drive. A spring 123 biases the base 110 downwards.

The operation of the pulling jaws is self-evident as is the operation of the orientation and arrester plates 105.

Referring to FIGS. 16, 17 and 18 there is illustrated an alternative construction of a chuck feed mechanism for use with the embodiment of FIGS. 14 and 15 which chuck feed mechanism is used for the orientation and arresting functions but not for the spin killing functions.

Lower driving plungers 130 of a drive chuck assembly are illustrated; the upper feed mechanism has three inwardly circumferentially arranged and preferably circumferentially offset spring loaded orientation plates 131 which have orientation faces 132 and support faces 133. A pulling jaw 134 is provided which is similar to that described with reference to FIGS. 14 and 15 having a first flat face 137 and a second flat face 138 except that it is provided with an upwardly projecting lug 135 having a spin killing surface 136.

In operation, a blank sits on the support face 133 and is engaged by the pulling jaws 134. The lower plungers 130 then open allowing a single blank to fall onto the spin killing surfaces 136 where it quickly comes to rest. The pulling jaw 134 is then operated drawing the lower nut blank down past the support faces 133 thus forcing the orientation plates 131 apart and opening out the orientation faces 132. This allows the nut resting on the spin killing surfaces 136 to move between the orientation faces 132. When the blank has been pulled fully through the device by the pulling jaw 134 the upper blank rests on the support faces 133 and the orientation faces 132 engage the uppermost blank and orientate it as described already. This embodiment, it will be appreciated operates by handling one blank through each stage of the operation at a time and not a multiplicity of blanks as in the embodiments described.

Figure 20:
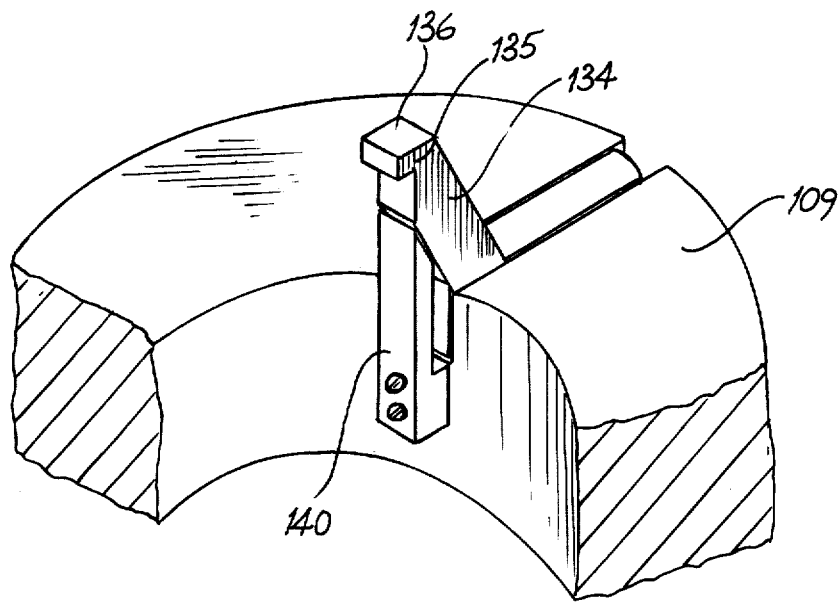
FIG. 20 is a perspective view of the pulling jaws of FIG. 19.
Figure 19:
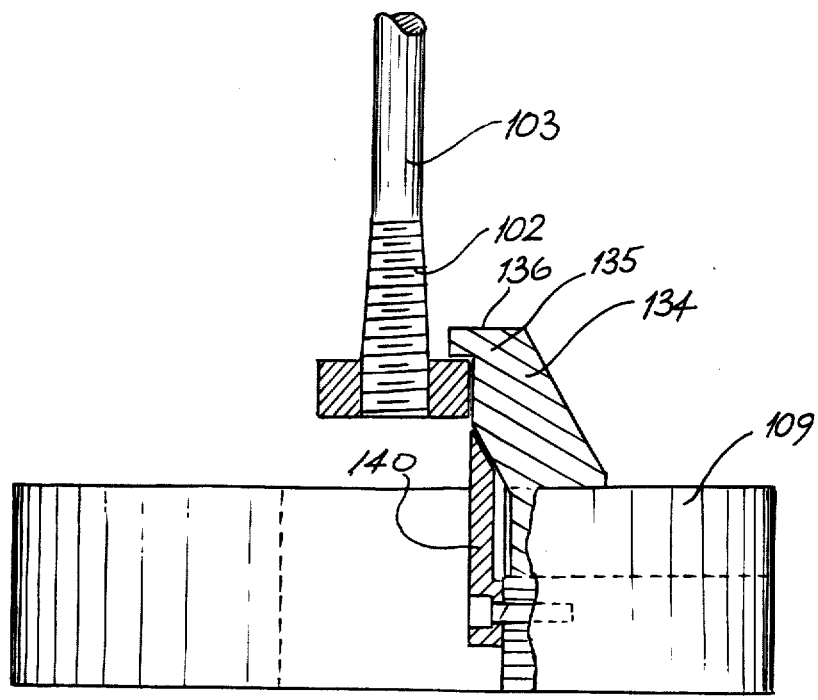
FIG. 19 is a vertical section through portion of a vertical nut tapping machine illustrating an alternative construction of pulling jaw.

Referring to FIGS. 19 and 20 there is illustrated another construction of pulling jaw substantially similar to that illustrated in FIGS. 16 to 18 and for use with the tapping machine of FIGS. 14 and 15. Parts similar to those described already with reference to these figures are identified by the same reference numerals. In this embodiment of the invention the pulling jaw 134 is provided with an extension piece 140 which effectively extends the vertical second flat face 138 of the pulling jaw. The wedge-shaped pitch 119 cam is so arranged that when the pulling jaw 134 reaches the position illustrated in FIG. 19 the pulling jaw 13 is allowed to move upwards before it disengages from the blank. As there is very little torque now being exerted on the nut blank the nut blank effectively runs off the end of the threaded screw cutting portion 102 of the tap. It will be appreciated that since the pulling jaw 134 will have started to retract that the production capacity of the machine can be increased as the time when the tap is not cutting is reduced.

In the embodiment described with reference to FIGS. 1 to 10 the sleeve 14 was moved by means of a Y shaped yoke 26. Needless to say, a simple bearing embracing the sleeve would perform the same function.

It will be readily appreciated that the shape of the various portions of the device will have to be altered depending on the type of blank being threaded. While in the embodiments above the shape and construction of the pulling jaws were described for the threading of flanged and plain hexagonal nuts, it will be readily appreciated that the blank chuck assembly and in particular the pulling jaws and blank chuck feed mechanism can be so arranged to accommodate other shapes of blank as long as there is at least a flat face on the blank at right angles to the exit face. If it is required to tap some other shape of blank such as for example a cylindrical blank that while the blank chuck assembly would still include a set of inwardly movable jaws, each jaw having a first flat face for engagement with the exit surface of the blank to true the blank relative of the tap that the remainder of the blank chuck assembly would of necessity have to be of a different construction to ensure that the blank was adequately secured in position to prevent its rotation during tapping.

Needless to say it will also be appreciated that the various parts of machine must be lubricated and bedded in oil and suitable arrangements can be made.

No attempt has been made to describe in any great detail the formation and construction of the various cams, and control circuits since all these are generally known to those skilled in the art. Sufficient is shown in the drawings to make it readily apparent how the particular embodiments operate.

In this invention the use of the pulling jaws in the blank chuck assembly means that the actual alignment of the blank relative to the axis of the tap is controlled by a flat face at right angles to the tap axis which in turn contacts a flat face of the blank, thus if the blank is correctly made the tap axis will be at right angles to the blank axis. It will be appreciated that it is only necessary for this one face of the blank to be machined accurately. Any irregularities in the construction of the blank will not in any way affect the accuracy of the screw cutting operation as long as the blank exit surface is flat and the blank hole axis is at right angles to that surface.

It will also be appreciated that since the pulling jaws allow a degree of lateral float or radial float that any irregularity there may be between the axis of the hole of the blank and the outer envelope will be compensated for. This will ensure that the tap as it starts to cut will centralise each blank so that the axis of the hole in the blank is truly concentric relative to the major crest diameter of the tap before commencement of the thread cutting operation on the blank.

In the embodiments above the orientation faces for the blank were spaced apart 125°, 120° and 115° circumferentially, they could also be spaced apart differentially as long as they are not equispaced. Indeed if no two orientation faces are spaced apart by 60° or any multiple thereof it is of necessity impossible for more than one corner of a hexagonal blank to be engaged by an orientation face. A particularly suitable spacing is 125°, 130° and 105°.

As mentioned already the trueness of the axis of the threaded hole formed during the thread cutting operation is assured by the arrester guide mechanism in the blank chuck assembly by providing a resistance to the passage of the blank when it is being pulled by the pulling jaws. This ensures that the blank is faced up true relative to the tap when it is presented at the commencement of the thread cutting operation. By the time the blank loses contact with the arrester guides it will have become engaged with a tap to sufufficient extent for its squareness relatively thereto to be retained through the thread cutting operation.

Lastly, it will be appreciated that the nut tapping machine according to the present invention ensures that very accurate pitch control is achieved. Hence, with precise pitch control and accurate face squareness a very high quality thread at high production rates can be cut. Dealing firstly with the blank chuck assembly of the embodiment of FIGS. 1 to 10 it will be seen that since the drive is taken directly from the tap drive any variations in tap speed will be transmitted to the pulling jaws ensuring synchronism. Additionally any play between the various pulling jaws is not cumulative and is immediately taken up under load.

Similarly with the embodiment illustrated in FIGS. 14 and 15 the pitch control which is performed by a wedge cam again driven directly from the tap drive is of necessity very precise.

It will also be appreciated that with some of the embodiments more than one nut can be tapped at the same time and thus further increase the through-put of the machine. It is also envisaged that different forms of tap may be devised to accommodate a large number of blanks at the one time.

We claim:
1. A tapping machine comprising:
   a base support;
   an elongated tap, having a tap shank and a threaded screw cutting portion, rotatably mounted in the support;
   a tap drive mounted on the base support;
   a tap drive chuck assembly for imparting rotary movement to the tap from the tap drive having two sets of shank embracing driving chucks longitudinally spaced apart relative to the tap shank;
   means for maintaining at least one of the sets of chucks always in engagement with the tap shank and for releasing the driving chucks sequentially from engagement with the tap shank to allow the passage of a blank along the shank;
   a blank chuck assembly, having a set of movable jaws arranged around the tap, each jaw having a first flat face for engagement with the exit surface of the blank to true the said exit surface of the blank relative to the tap axis;
   means for moving the jaws radially inwards and outwards relative to the tap; and
   means for imparting relative linear movement along the tap axis between the threaded screw cutting portion of the tap and the blank chuck assembly.

2. A tapping machine is recited in claim 1 in which the nut tapping machine has a substantially vertically arranged straight tap.

3. A tapping machine as recited in claim 1 or 2 in which the jaws are pulling jaws and the blank chuck assembly includes means for moving the set of jaws axially relative to the tap to pull the blank along the threaded screw cutting portion of the tap from an entry position to a discharge position.

4. A tapping machine as recited in claim 3 in which there is a set of three pulling jaws each jaw having a second flat face to engage the vertical side of a hexagonal nut blank.

5. A tapping machine as recited in claim 4 in which the means for moving each jaw inwardly and axially is an endless chain.

6. A tapping machine as recited in claim 5 in which there is a plurality of jaws mounted on each chain and in which each chain is driven through a gearbox from the tap drive.

7. A tapping machine as recited in claim 4 in which the pulling jaw is mounted on a base which is slidably mounted on a machine support parallel to the tap axis.

8. A tapping machine as recited in claim 7 in which the base has a roller forming a cam follower which rests on and is spring biased against a wedge shaped pitch cam for axial movement of the jaw, said cam, in turn, being controlled by an edge cam.

9. A tapping machine as recited in claim 8 in which the edge cam is driven through a gearbox from the tap drive.

10. A tapping machine as recited in claim 9 in which the base is arranged to reverse direction before the pulling jaws have pulled the blank off the threaded screw cutting portion of the tap to disengage the first flat face of each jaw from the tap and in which each pulling jaw has an elongated second flat face extending from the first flat face to engage the blank while the blank is on the tap.

11. A tapping machine as recited in claim 10 in which the blank chuck assembly includes a blank chuck feed mechanism mounted for reception of a blank before engagement with a set of pulling jaws said blank chuck feed mechanism including three circumferentially arranged orientation plates each having an orientation face for engagement with the vertical side of a hexagonal nut blank and a support face for engagement with an underneath face of a hexagonal nut blank, the plates being spring biased inwards to engage the hexagonal nut blank and movable to a first position where the hexagonal nut blank rests between but spaced apart from the orientation faces and then to a second position where the orientation faces engage the vertical sides of the hexagonal nut blank.

12. A tapping machine as recited in claim 11 in which the orientation plates are not equispaced circumferentially.

13. A tapping machine as recited in claim 12 in which the orientation plates are spaced 125°, 120° and 115° circumferentially.

14. A tapping machine as recited in claim 13 in which each orientation plate includes a spin killing surface for reception of a nut blank prior to moving into the first position.

15. A tapping machine as recited in claim 13 in which each pulling jaw is provided with an upwardly directed portion forming a spin killing surface which, in use, lies above the orientation plates in the uppermost position of travel of the pulling jaw.

16. A tapping machine as recited in claim 15 in which the orientation faces of the orientation plates extend to the entry position for the threaded screw cutting portion of the tap to provide an initial resistance to the passage of the blank relative to the threaded screw cutting portion of the tap.

17. A tapping machine as recited in claim 15 in which a plurality of circumferentially arranged arrester guides, having blank engaging faces and being spring biased radially inwards are mounted at the entry position for the threaded screw cutting portion of the tap to provide an initial resistance to the passage of the blank relative to threaded screw cutting portion of the tap.

18. A tapping machine as recited in claim 17 in which portion of the tap shank and the tap drive chuck assembly are housed in a hollow drive sleeve adapted to hold a supply of blanks.

19. A tapping machine as recited in claim 18 in which each set of shank-embracing driving chucks comprises: three plungers substantially, equally spaced circumferentially, each plunger being housed in an axially arranged slot in a sleeve, connected to the hollow drive sleeve by an axially arranged key; a cam connected to each plunger; and means for reciprocating the sleeve axially to cause the chucks to engage and disengage from the tap shank under influence of the cam.

20. A tapping machine as recited in claim 19 in which the cam comprises a profile block having a slot communicating with the slot in the sleeve for reception of each plunger, each plunger having a further camming slot for reception of a transversely mounted follower on the plunger.

21. A tapping machine as recited in claim 12 in which the orientation plates are spaced 125°, 130° and 105° circumferentially.

* * * * *